T. BARROW.
STAYBOLT CONNECTION FOR HOLLOW STRUCTURES AND METHOD OF FORMING THE SAME.
APPLICATION FILED FEB. 20, 1918.

1,333,372.

Patented Mar. 9, 1920.
2 SHEETS—SHEET 1.

WITNESSES
R A Balderson
F N Windridge

INVENTOR
Thomas Barrow
by Bakewell, Byrnes & Parmelee
Attys

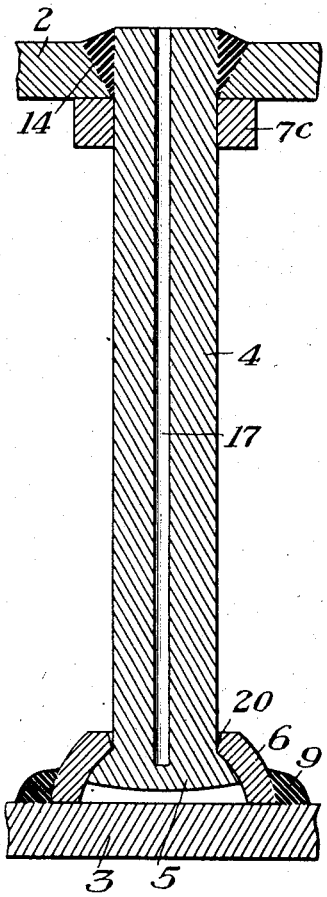
Fig. 6.
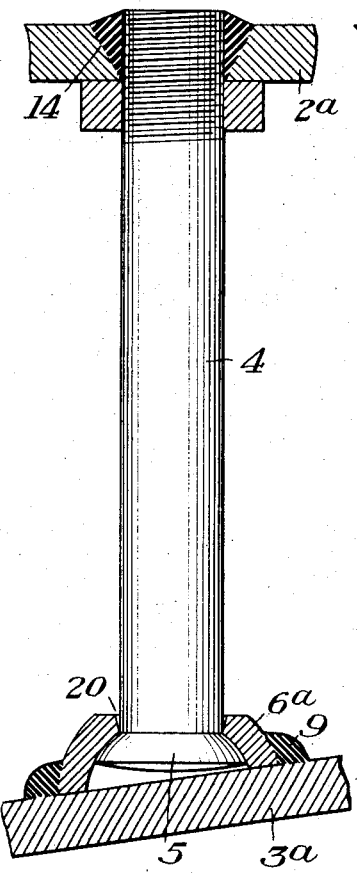
Fig. 7.
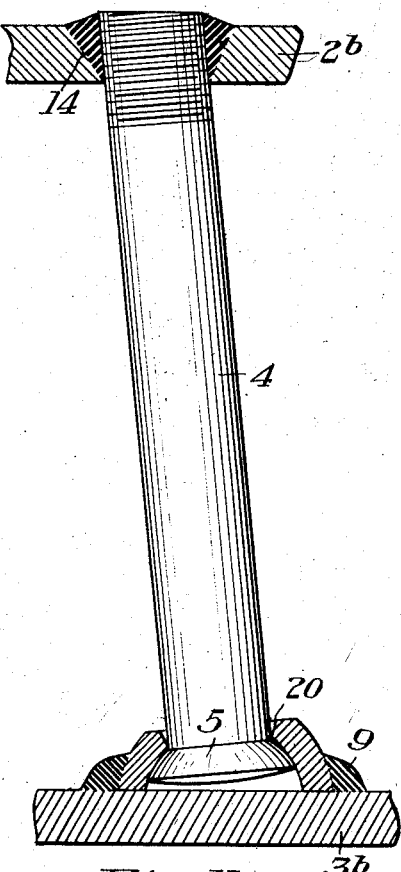
Fig. 8.
Fig. 11.
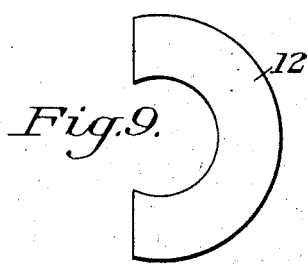
Fig. 9.
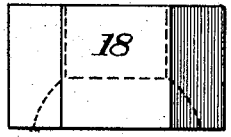
Fig. 10.

UNITED STATES PATENT OFFICE.

THOMAS BARROW, OF WHEATLAND, PENNSYLVANIA, ASSIGNOR TO BLAW-KNOX COMPANY, OF HOBOKEN, PENNSYLVANIA, A CORPORATION OF NEW JERSEY.

STAYBOLT CONNECTION FOR HOLLOW STRUCTURES AND METHOD OF FORMING THE SAME.

1,333,372.      Specification of Letters Patent.      Patented Mar. 9, 1920.

Application filed February 20, 1918. Serial No. 218,347.

*To all whom it may concern:*

Be it known that I, THOMAS BARROW, a citizen of the United States, residing at Wheatland, in the county of Mercer and State of Pennsylvania, have invented a new and useful Improvement in Staybolt Connections for Hollow Structures and Methods of Forming the Same, of which the following is a full, clear, and exact description, reference being had to the accompanying drawings, forming part of this specification, in which—

Figures 1, 2, 3, 6, 7 and 8 are sectional views partly broken away illustrating six different forms of my invention;

Fig. 9 is a plan view of a washer member;

Fig. 10 is a side view of a modified form of socket member; and

Fig. 11 is a sectional view of still another form of socket member.

My invention has relation to stay-bolt connections for hollow sheet metal structures of various kinds, and is designed to provide a connection of this character which will be simple and efficient and which will possess sufficient flexibility to permit of relative movements of the parts of the structure which it connects. Also to provide a novel method of assembling the parts in building a structure provided with such connections.

Figure 1:
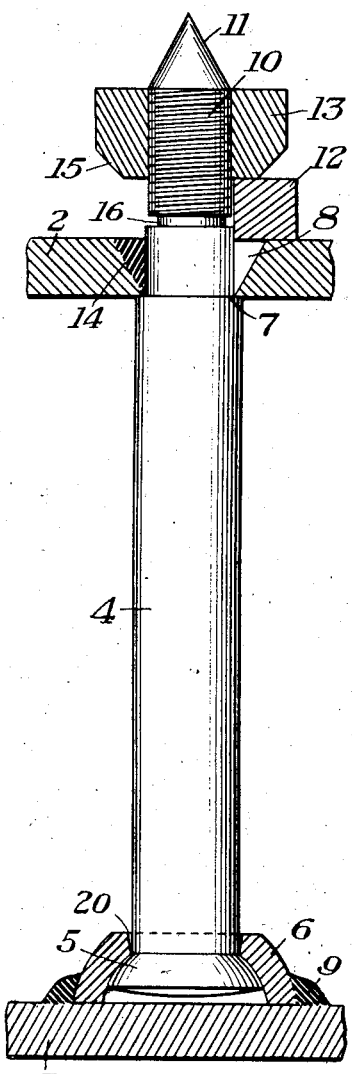

Referring first to that form of my invention shown in Fig. 1, the numerals 2 and 3 designate portions of opposite walls of a sheet or plate metal structure. 4 designates a stay bolt having a head 5 at one end, provided with a convex bearing surface, and which engages a corresponding concave bearing surface on the interior of a socket member 6, secured to the member 3. The opposite end portion of the bolt is shouldered, as indicated at 7, and the part thereof beyond the shoulder extends through an opening 8 in the member 2, this opening being preferably outwardly beveled, as shown.

In carrying out my invention, I secure the socket members 6 to the member 3 by a welded connection, such as indicated at 9, a stay-bolt having been inserted through each of the socket members previous to welding. When all the bolts which are to be used in any given structure have thus been attached to the member 3, the member 2 is placed over the opposite ends of all the bolts. Each of the bolts is provided with a threaded extension 10, preferably terminating in a point 11, which will facilitate insertion of the bolts through the holes 8. After the member 2 has been seated, a washer 12 is placed over the projecting end of the bolt and seated on the member 2, this washer being a part washer, such as shown in detail in Fig. 9. A nut 13 is then screwed on to the threaded extension 10 and down against the washer 12, thereby forcing the member 2 securely against the shoulder 7 of the bolts. A partial weld is then effected at one side of the bolt, as indicated at 14, this weld being made through the open side of the washer and being sufficient in extent to temporarily secure the member 2 to the bolts. To further facilitate the making of this weld, the lower portion of the nut 13 may be beveled, as indicated at 15.

After the partial welds have been made, the nut 13 and washer 12 are removed, the weld completed in a manner similar to that shown in Figs. 6, 7 and 8, and the projecting end portion of the bolt is cut off. To facilitate this cutting off, the bolt may be provided with a reduced portion 16; or the projecting end of the bolt may be cut off before completing the weld.

Figure 2:
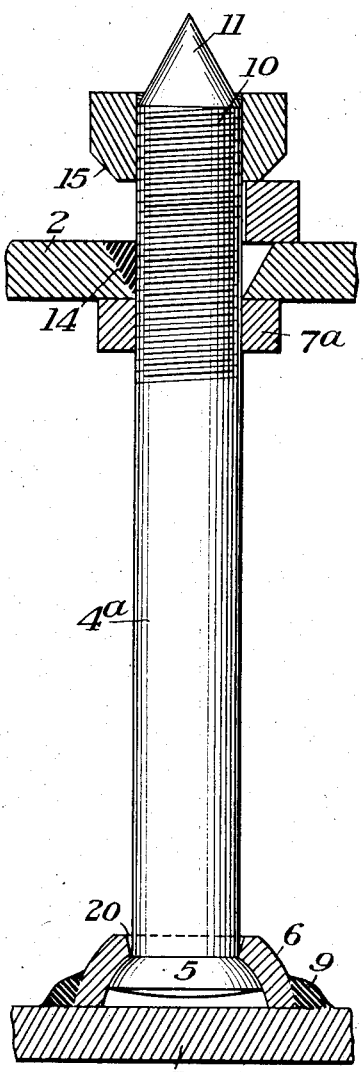

The form of my invention shown in Fig. 2 is similar to that shown in Fig. 1, except that instead of providing the bolt $4^a$ with an abutment in the form of a shoulder, the threaded portion thereof is extended through the member 2 to receive a nut $7^a$, which forms a seat or abutment for the member 2. In this form, this end portion of the bolt is shown as of uniform diameter.

Figure 3:
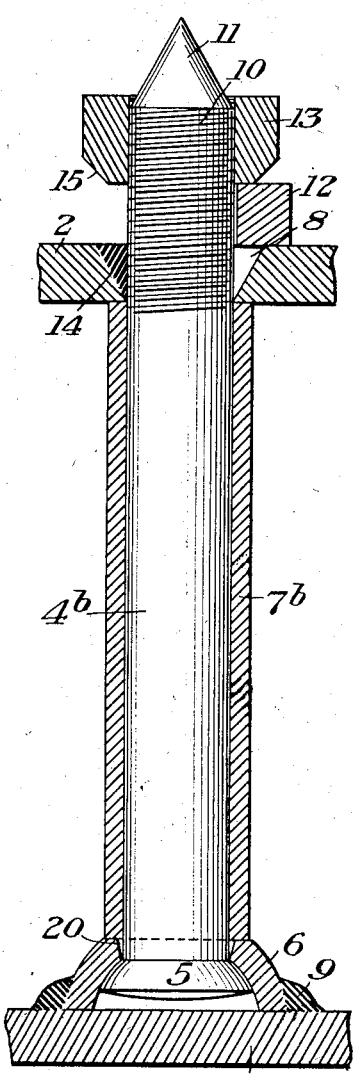
Figure 4:
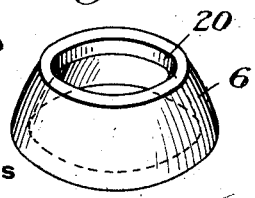
Fig. 4 is a perspective view of one of the socket members.
Figure 5:
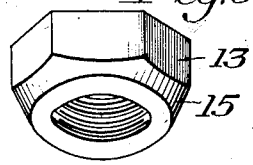
Fig. 5 is a similar view of one of the nuts.

In the form of my invention shown in Fig. 3, the bearing for the member 2 is provided by a sleeve $7^b$, seated around the bolt $4^b$, the other parts being similar to those shown in Fig. 2.

In Fig. 6, I have shown the bolt as provided with a longitudinal interior opening 17, which will operate in the manner of a telltale hole, to indicate leakage should breakage of the bolt occur. In this figure, also, I have shown the annular bearing member 7ᶜ as brazed, shrunk or otherwise secured on the bolt. In this figure, as well as in Figs. 7 and 8, the projecting ends of the bolts have been removed and the welds are shown in their completed forms. It will be understood, however, that similar extensions are used in these forms.

Fig. 7 shows the application of my invention to a structure in which the member 3ª is at an angle to the member 2. The construction is similar to that shown in Fig. 2, except that the socket member 6ª has a skew bottom face which is adapted to the inclined face of the member 3ª.

Fig. 8 shows the application of my invention to a condition in which it may be desired to extend the stay-bolt at an oblique angle to the members 2ᵇ and 3ᵇ. In this form, I have not provided any interior bearing for the member 2ᵇ, except the threads on the bolt. It may, however, be provided with any suitable bearing having its surface shaped to suit the inner surface of the member 2ᵇ.

In Fig. 10, I have shown a modified form of socket member 18, which may be made from angular stock, such as a hexagon rod.

Fig. 11 shows a form of the coupling member 6ᶜ, which is provided with one or more openings 19, extending into its interior in order to facilitate the entrance of water thereto. Where my invention is used in a water-containing structure, it may be advantageous that water shall enter freely within the coupling member so as to water-cool the adjacent parts. Some water will enter in all of the forms, owing to the fact that an absolutely close bearing fit will not be made between the ball heads, the bolt and the coupling, but freer circulation may be provided for by one or more of the openings, such as shown at 19, in Fig. 11.

The opening for the coupling is preferably beveled, as indicated at 20 in the various figures, so as to facilitate the freedom of movement of the bolts, and thus permit it to adapt itself readily to the relative movement of one of the plates or sheets with respect to the other one.

It will be noted that my invention provides an efficient form of stay connection between the opposite sheets or plates of a hollow structure, without depending upon any threaded connection of the bolt with either of said members. In the use of my invention, it is entirely unnecessary to perforate one of the sheets or plates for the reception of the stay connections, and the connection of the bolts with the other sheet or plate is made practically integral by the welding operations described.

The welds can be made of sufficient strength to withstand relatively high pressures and the parts can be readily assembled in the manner described. The use of the threaded extensions and the tightening nuts engaging the same insures a proper seating of the parts before the members are finally welded.

I claim:

1. The herein described method of making hollow structures, which consists in inserting a headed stay-bolt into a hollow coupling or socket member, welding said member to the inner surface of one wall of the structure, engaging the other wall of the structure with the opposite end portion of the stay-bolt, holding said opposite wall to its seat on said bolt and effecting a partial weld of the bolt therein, and then removing the holding means before completing the weld substantially as described.

2. The herein described method of making hollow structures, which consists in providing a stay-bolt having a head at one end and a threaded extension at its opposite end engaging the headed end of the bolt with a coupling or socket member and welding said coupling or socket member to the inner surface of one wall of the structure, engaging the opposite wall of the structure with the opposite end portion of the bolt, applying a nut and partial washer to the threaded extension of the bolt and thereby seating said opposite wall securely on the bolt, partially welding the bolt to the opposite wall, and removing the nut, the washer and extension and completing the weld, substantially as described.

3. The herein described method of making hollow structures connected by staybolts, which consists in securing the end of the staybolt to one wall of the structure, engaging the other wall of the structure with the opposite end portion of the staybolt, holding said opposite wall to its seat on said bolt and effecting a partial weld of the bolt therein, and then removing the holding means before completing the weld, substantially as described.

4. A metal structure having opposite wall-forming members, and a staybolt connection therefor, said stay-bolt having means formed on one end thereof for securing the same to one of the walls, a threaded extension formed on the opposite end adapted to pass through the other wall, a part washer coöperating therewith to permit the formation of a partial weld to the second wall, and means coöperating with the washer to hold the walls in position during the formation of said weld, substantially as described.

5. A staybolt for use in hollow structures having opposed walls having means formed on the end thereof for securing the same to one of the walls, a reduced threaded extension formed on the opposite end adapted to pass through the other wall, a part washer coöperating therewith to permit the formation of a partial weld to the second wall, and a nut having a beveled lower portion coöperating with the washer to hold the walls in position during the formation of said weld, substantially as described.

6. A metal structure having opposite wall-forming members, and a stay-bolt connection therefor, said stay-bolt having means formed on one end thereof for securing the same to one of the walls, a reduced threaded extension formed on the opposite end adapted to pass through the other wall, a part washer coöperating therewith to permit the formation of a partial weld of the second wall, and means coöperating with the washer to hold the walls in position during the formation of said weld, said reduced extension facilitating the removal thereof after the completion of the weld, substantially as described.

7. A staybolt for use in hollow structures having opposed walls having a head formed on one end thereof, a coupling member coöperating therewith and adapted to be secured to one of the walls of the structure, a threaded extension formed on the opposite end adapted to pass through the other wall of said structure, a part washer coöperating therewith to permit the formation of a partial weld to the second wall, and a nut coöperating with the washer to hold the walls in position during the formation of said weld, substantially as described.

8. A staybolt for use in hollow structures having opposed walls having a convex head formed on one end thereof, a coupling member having a concave bearing surface coöperating with the head and adapted to be secured to one of the walls of the structure, an extension formed on the opposite end adapted to pass through the other wall of the structure, a part washer coöperating therewith to permit the formation of a partial weld to the second wall, and means coöperating with the washer to hold the walls in position during the formation of said weld, substantially as described.

9. A metal structure having opposite wall-forming members, and a stay-bolt connection therefor, said connection comprising a coupling secured to the inner surface only of one of the wall-forming members, said coupling having a concave inner bearing surface and a co-axial opening for the bolt, and a stay-bolt passing through said opening and welded at one end portion within the opposite wall-forming member, and having an enlarged end flexibly engaging the concave bearing surface of the coupling, substantially as described.

10. In a metal structure, the combination with the two members forming opposite walls of the structure, of a socket piece welded to the inner imperforate surface of one of said members, said socket piece having an inner concave bearing surface and a co-axial opening leading therefrom, and a stay-bolt rigid between its ends with a convex head at one end forming a flexible ball and socket engagement with said socket piece adjacent said imperforate wall, and having its opposite end portion secured to the other wall-forming member, substantially as described.

11. A metal structure comprising in combination with the two members forming the opposite walls of the structure, a socket member secured to the inner imperforate surface only of one wall of the structure, a stay-bolt having a head at one end portion, said head having a ball and socket engagement with the socket member adapted to be made before said member is secured to the inner wall, the opposite end portion of the bolt extending through an opening in the opposite wall of the structure and secured thereto, said socket member having openings therein for permitting water to enter the interior thereof, substantially as described.

12. A metal structure comprising in combination with the two members forming the opposite walls of the structure, a socket member welded to the inner surface only of one member of the structure and projecting inwardly thereof, and a stay-bolt having at one end a ball and socket engagement with said socket member adjacent said inner wall and intermediate the walls of the structure, and at its opposite end extending through an opening in the opposite wall of the structure and united thereto by welding, said stay-bolt having an abutment engaging the inner surface of said opposite wall, substantially as described.

13. A metal structure comprising in combination with the two members forming the opposite walls of the structure, a socket member welded to the inner surface only of one member of the structure, said socket member having an opening through which a stay-bolt is adapted to be passed prior to said welding operation, and a stay-bolt having a ball and socket engagement with said coupling member at one end and extending through an opening in the opposite wall of the structure and united thereto by welding, substantially as described.

In testimony whereof, I have hereunto set my hand.

THOMAS BARROW.